(12) United States Patent
Rahman et al.

(10) Patent No.: US 9,503,259 B2
(45) Date of Patent: Nov. 22, 2016

(54) SYSTEM AND METHOD FOR GENERATING AND PROTECTING CRYPTOGRAPHIC KEYS

(75) Inventors: SK MD Mizanur Rahman, Ottawa (CA); James Muir, Ottawa (CA)

(73) Assignee: Irdeto B.V., Hoofddorp (NL)

(*) Notice: Subject to any disclaimer, the term of this patent is extended or adjusted under 35 U.S.C. 154(b) by 40 days.

(21) Appl. No.: 14/377,499

(22) PCT Filed: Feb. 9, 2012

(86) PCT No.: PCT/CA2012/000114
§ 371 (c)(1),
(2), (4) Date: Aug. 7, 2014

(87) PCT Pub. No.: WO2013/116916
PCT Pub. Date: Aug. 15, 2013

(65) Prior Publication Data
US 2015/0333906 A1 Nov. 19, 2015

(51) Int. Cl.
*H04L 9/00* (2006.01)
*H04L 9/08* (2006.01)
(Continued)

(52) U.S. Cl.
CPC ............... *H04L 9/0869* (2013.01); *G06F 7/58* (2013.01); *G06F 7/72* (2013.01); *H04L 9/0841* (2013.01);
(Continued)

(58) Field of Classification Search
None
See application file for complete search history.

(56) References Cited

U.S. PATENT DOCUMENTS 6,668,325 B1 12/2003 Collberg et al.
7,397,916 B2 7/2008 Johnson et al.
(Continued)

FOREIGN PATENT DOCUMENTS

EP 1729442 A2 12/2006
WO 2011120125 A1 10/2011

OTHER PUBLICATIONS

International Search Report for corresponding International Application No. PCT/CA2012/000114 dated Nov. 14, 2012.
(Continued)

*Primary Examiner* — Farid Homayounmehr
*Assistant Examiner* — Olanrewaju Bucknor
(74) *Attorney, Agent, or Firm* — Marc S. Kaufman; Amardeep S. Grewal; Reed Smith LLP

(57) ABSTRACT

In the present disclosure, implementations of Diffie-Hellman key agreement are provided that, when embodied in software, resist extraction of cryptographically sensitive parameters during software execution by white-box attackers. Four embodiments are taught that make extraction of sensitive parameters difficult during the generation of the public key and the computation of the shared secret. The embodiments utilize transformed random numbers in the derivation of the public key and shared secret. The traditional attack model for Diffie-Hellman implementations considers only black-box attacks, where attackers analyze only the inputs and outputs of the implementation. In contrast, white-box attacks describe a much more powerful type of attacker who has total visibility into the software implementation as it is being executed.

39 Claims, 6 Drawing Sheets

(51) Int. Cl.
*G06F 7/58* (2006.01)
*G06F 7/72* (2006.01)
*H04L 9/30* (2006.01)

(52) U.S. Cl.
CPC ......... H04L 9/3066 (2013.01); *H04L 2209/16* (2013.01)

(56) References Cited

U.S. PATENT DOCUMENTS

| | | | | |
|---|---|---|---|---|
| 7,450,720 | B2* | 11/2008 | Roelse | H04L 9/0618 380/259 |
| 7,499,544 | B2* | 3/2009 | Jao | G06F 7/725 380/30 |
| 8,549,299 | B2* | 10/2013 | Struik | H04L 9/0844 380/282 |
| 2006/0029221 | A1* | 2/2006 | Ibrahim | G06F 7/725 380/28 |
| 2006/0179319 | A1* | 8/2006 | Krawczyk | G06Q 20/3678 713/180 |
| 2007/0064931 | A1* | 3/2007 | Zhu | G06F 7/725 380/30 |
| 2007/0098179 | A1* | 5/2007 | Nave | G11B 20/00086 380/286 |
| 2008/0263363 | A1* | 10/2008 | Jueneman | G06F 21/32 713/184 |
| 2008/0273695 | A1* | 11/2008 | Al-Gahtani | G06F 7/725 380/30 |
| 2009/0041229 | A1* | 2/2009 | Douguet | G06F 7/725 380/28 |
| 2009/0100264 | A1* | 4/2009 | Futa | H04L 9/0844 713/170 |
| 2009/0252327 | A1 | 10/2009 | Ciet et al. | |
| 2010/0023771 | A1* | 1/2010 | Struik | H04L 9/002 713/171 |
| 2010/0205443 | A1* | 8/2010 | Zhao | H04L 9/3218 713/171 |
| 2012/0221858 | A1* | 8/2012 | Struik | H04L 9/0844 713/171 |
| 2013/0297936 | A1* | 11/2013 | Khosravi | G06F 21/10 713/168 |

OTHER PUBLICATIONS

Hamilton E. Link et al., "Clarifying Obfuscation: Improving the Security of White-Box Encoding", Cryptology ePrint Archive (2005), ITCC '05: Proceedings of the International Conference on Information Technology: Coding and Computing (ITCC '05)—vol. I.

Marc Joye, "On White-Box Cryptography", Trafford Publishing, 2008.

Extended European Search Report cited in corresponding European Application No. 12868015.4 dated.

Ciet M. and Joye M. "Virtually Free randomization techniques elliptic curve cryptography", SCN 2002, LNCS, vol. 2836, Oct. 10, 2003, pp. 348-359.

* cited by examiner

Alice $Q_A$

Available: $\hat{\hat{r}}_{11(A)}, \hat{\hat{r}}_{22(A)}, Q_B$ (from Bob)

(Target: to compute)

$P = (r_{1(A)}+1)Q_B$ or $P = (r_{2(A)}+1)Q_B$

When $r_1$ is chosen:
$\hat{Q}_{B_{11}} = k_{11(A)}^{-1} * Q_B$
$\hat{Q}_{B_{12}} = \left(2 * \hat{\hat{r}}_{11(A)} - \hat{\hat{r}}_{22(A)} \mod 2^N\right) * \hat{Q}_{B_{11}}$
$\hat{Q}_{B_{13}} = (k_{11(A)} - k_{12(A)}) * \hat{Q}_{B_{11}}$
$P = \hat{Q}_{B_{12}} + \hat{Q}_{B_{13}}$ When $r_2$ is chosen:
$\hat{Q}_{B_{21}} = k_{21(A)}^{-1} * Q_B$
$\hat{Q}_{B_{22}} = \left(\hat{\hat{r}}_{22(A)} - \hat{\hat{r}}_{11(A)} \mod 2^N\right) * \hat{Q}_{B_{21}}$
$\hat{Q}_{B_{23}} = (k_{21(A)} - k_{22(A)}) * \hat{Q}_{B_{21}}$
$P = \hat{Q}_{B_{22}} + \hat{Q}_{B_{23}}$

Bob $Q_B$ $Q_A$ (from Alice), Available: $\hat{\hat{r}}_{11(B)}, \hat{\hat{r}}_{22(B)}$ (Target: to compute)

$P = (r_{1(B)}+1)Q_A$ or $P = (r_{2(B)}+1)Q_A$

When $r_1$ is chosen:
$\hat{Q}_{A_{11}} = k_{11(B)}^{-1} * Q_A$
$\hat{Q}_{A_{12}} = \left(2 * \hat{\hat{r}}_{11(B)} - \hat{\hat{r}}_{22(B)} \mod 2^N\right) * \hat{Q}_{A_{11}}$
$\hat{Q}_{A_{13}} = (k_{11(B)} - k_{12(B)}) * \hat{Q}_{A_{11}}$
$P = \hat{Q}_{A_{12}} + \hat{Q}_{A_{13}}$ When $r_2$ is chosen:
$\hat{Q}_{A_{21}} = k_{21(B)}^{-1} * Q_A$
$\hat{Q}_{A_{22}} = \left(\hat{\hat{r}}_{22(B)} - \hat{\hat{r}}_{11(B)} \mod 2^N\right) * \hat{Q}_{A_{21}}$
$\hat{Q}_{A_{23}} = (k_{21(B)} - k_{22(B)}) * \hat{Q}_{A_{21}}$
$P = \hat{Q}_{A_{22}} + \hat{Q}_{A_{23}}$

Fig.6

Alice $Q_A$ | Bob $Q_B$

Available: $\hat{\hat{r}}_{11(A)}, \hat{\hat{r}}_{22(A)}, Q_B$ (from Bob) | $Q_A$ (from Alice), Available: $\hat{\hat{r}}_{11(B)}, \hat{\hat{r}}_{22(B)}$ (Target: to compute)
$P = (r_{1(A)} + 1)Q_B$ or $P = (r_{2(A)} + 1)Q_B$ (Target: to compute)
$P = (r_{1(B)} + 1)Q_A$ or $P = (r_{2(B)} + 1)Q_A$ When $r_1$ is chosen:
$\hat{Q}_{B_{11}} = k_{11(A)}^{-1} * Q_B$
$\hat{Q}_{B_{12}} = (2 * \hat{\hat{r}}_{11(A)} - \hat{\hat{r}}_{22(A)} \mod 2^N) * \hat{Q}_{B_{11}}$ $P = \hat{Q}_{B_{12}} + Q_B$ When $r_2$ is chosen:
$\hat{Q}_{B_{21}} = k_{21(A)}^{-1} * Q_B$
$\hat{Q}_{B_{22}} = (\hat{\hat{r}}_{22(A)} - \hat{\hat{r}}_{11(A)} \mod 2^N) * \hat{Q}_{B_{21}}$ $P = \hat{Q}_{B_{22}} + Q_B$ When $r_1$ is chosen:
$\hat{Q}_{A_{11}} = k_{11(B)}^{-1} * Q_A$
$\hat{Q}_{A_{12}} = (2 * \hat{\hat{r}}_{11(B)} - \hat{\hat{r}}_{22(B)} \mod 2^N) * \hat{Q}_{A_{11}}$ $P = \hat{Q}_{A_{12}} + Q_A$ When $r_2$ is chosen:
$\hat{Q}_{A_{21}} = k_{21(B)}^{-1} * Q_A$
$\hat{Q}_{A_{22}} = (\hat{\hat{r}}_{22(B)} - \hat{\hat{r}}_{11(B)} \mod 2^N) * \hat{Q}_{A_{21}}$ $P = \hat{Q}_{A_{22}} + Q_A$

Fig.8

SYSTEM AND METHOD FOR GENERATING AND PROTECTING CRYPTOGRAPHIC KEYS

RELATED APPLICATION DATA

This application claims priority to International Patent Application No. PCT/CA2012/000114, filed Feb. 9, 2012, the disclosure of which is hereby incorporated by reference in its entirety

FIELD OF THE INVENTION

The present invention relates to methods of generating and protecting cryptographic keys, and is particularly concerned with doing so in a white-box attack environment.

BACKGROUND OF THE INVENTION

Traditionally, cryptographic implementations were designed to resist only black-box attacks. These are attacks where an adversary attempts to deduce the cryptographic key inside the implementation by analyzing only inputs and outputs. In a black-box attack, it is assumed that the adversary knows what family of cryptographic algorithm they are targeting (e.g., AES, DES, RSA, etc.), but all other details (e.g. execution time, power consumption, memory accesses) are unavailable to them. In essence, a black-box attacker treats the implementation as a mathematical function. However, a white-box attacker is a much more powerful type of adversary and can analyze all parts of the implementation. Rather than just study inputs and outputs, a white-box attacker can see everything that goes on inside the implementation. For example, if the attacker is targeting cryptographic software running on, say, a PC or mobile phone, then they can execute that software inside a debugger and examine memory and register values during its execution. Conventional software implementations of cryptographic algorithms are completely insecure against white-box attackers since the cryptographic key can be observed in memory. New implementations of cryptographic algorithms that resist white-box attacks have recently been proposed (e.g., AES [1], DES [2], ECDSA [3], SHA [4]); however, there have not yet been any proposals for protecting key agreement algorithms, such as Diffie-Hellman [5].

The systems and methods disclosed herein provide techniques for implementing a key agreement scheme that resists white-box attacks.

SUMMARY OF THE INVENTION

An object of the present invention is to provide methods for protecting cryptographic keys and other sensitive parameters from a white-box attacker in implementations of key agreement schemes such as Diffie-Hellman.

Elliptic curve Diffie-Hellman (ECDH) is a variant of traditional Diffie-Hellman (DH) where computations are done in an algebraic group defined by points on an elliptic curve. ECDH is defined in the document "SEC 1: Elliptic Curve Cryptography, Version 2.0" [8] and in "Suite B Implementer's Guide to NIST SP 800-56A" [7]. Introductory information on elliptic curve cryptography and ECDH can be found in the text "Guide to Elliptic Curve Cryptography" by Hankerson, Menezes and Vanstone [9]. At high level, ECDH works as follows: two parties exchange public keys and combine them with their respective private keys to derive a shared secret. Even though their respective private keys are different, the mathematics underlying ECDH ensures that each party will derive the same shared secret. Private keys are typically just random numbers, and a corresponding public key is computed from a private key using a mathematical operation that is computationally easy to evaluate but very computationally expensive to invert.

ECDH is utilized in a number of cryptographic protocols including Transport Layer Security (TLS), which is used to secure Internet web browsing, and the Full Authentication protocol, which is part of the Digital Transmission Content Protection (DTCP) system [10]. The shared key established using ECDH can be used to build a secure channel between end-parties (i.e. using symmetric key cryptography for message confidentiality and authentication). Any attacker sitting between the end-parties that records and analyzes messages exchanged during the ECDH scheme should not be able to recover the shared key unless they carry out some computation which is widely believed to be infeasible. However, in some applications, the attacker does not sit between the end-parties; instead, the attacker is able to observe the ECDH computations taking place at one of the end-parties. This is a potential concern in DTCP.

DTCP is a digital rights management (DRM) scheme and is commonly used to enforce permissions on video content in home networks. For example, a user might wish to stream video from their set-top box to a personal device like a laptop or mobile phone. If the rights associated with the video content permit this activity, the set-top box will initiate ECDH with the personal device to derive a shared key; the shared key is used to encrypt video content as it is transmitted to the personal device where it will be played. If an attacker was able to determine the shared key, then it would be able to record the video stream and decrypt it outside the DRM system, thereby freeing it from any restrictions. In this scenario, a legitimate user may act as an attacker if they are motivated to free video content from the DRM system. Users are able to observe the computations that take place on their personal device using a debugger and other tools. For this reason, malicious users can be modeled as white-box attackers. This leads to the following question: can an ECDH shared secret be computed in a white-box environment without exposing the shared secret to an attacker?

In the present disclosure, four embodiments of ECDH that are resistant to white-box attacks are provided; these embodiments can be used to build software implementations that are able to derive cryptographic keys and establish trust in hostile execution environments. Although our description focuses on the elliptic curve variant of Diffie-Hellman, one skilled in the art will appreciate that these embodiments can easily be adapted to any Diffie-Hellman scheme; this includes, in particular, Diffie-Hellman schemes where the underlying algebraic group is a subgroup of a finite field.

The four embodiments generate and manipulate transformed random numbers. A transformed random number is an obfuscated or masked form of an original random number. In each embodiment, a transformed random number, denoted by $\hat{r}$ or $\tilde{r}$, is used to generate an ECDH public key. The same transformed random number is then used to generate the shared secret. The resultant public key, generated using the transformed random number, will be the same as what would be generated using the original random number. This property also holds for generation of the shared secret. To accomplished this, some auxillary elliptic curve points must be pre-computed and utilized in the computations.

In the first embodiment, we generate a transformed random number r̂ using a linear transformation defined by two instance-specific, compile time, random numbers $k_1$ and $k_2$ chosen from the interval 1 to n−1 where n denotes the size of the underlying elliptic curve group. In the second embodiment, we generate a transformed random number r̂ using a linear transformation defined by one instance-specific, compile time, random number $k_1$, chosen from the interval 1 to n−1. This approach is similar to the first embodiment except that only one compile time random number is used to generate the transformed random number r̂. In the third embodiment, a transformed random number r̂̂ is generated by applying a pseudo-Hadamard transformation [11] to the transformed random number r̂ that is generated in the first embodiment. In the fourth embodiment, a transformed random number r̂̂ is generated applying a pseudo-Hadamard transformation to the transformed-random number r̂ that is generated in the second embodiment.

BRIEF DESCRIPTION OF THE DRAWINGS

The present invention will be further understood from the following detailed description with reference to the drawings in which:

FIG. 6 illustrates shared secret generation for White-Box Elliptic Curve Diffie-Hellman (WB-ECDH) in accordance with the third embodiment of the present disclosure;

FIG. 8 illustrates shared secret generation for White-Box Elliptic Curve Diffie-Hellman (WB-ECDH) in accordance with the fourth embodiment of the present disclosure.

SYMBOLS USED TO DESCRIBE THE PREFERRED EMBODIMENT

Figure 1:
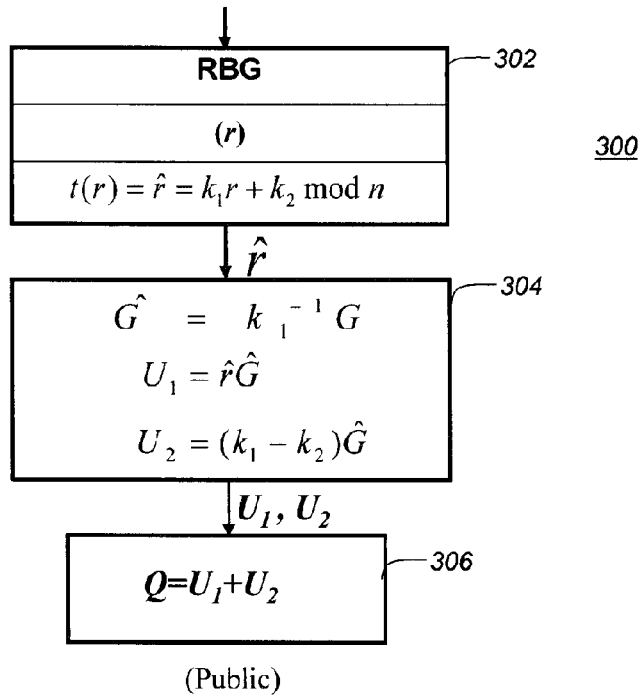
FIG. 1 illustrates public key generation for White-Box Elliptic Curve Diffie-Hellman (WB-ECDH) in accordance with a first embodiment of the present disclosure.

The following symbols are used within this disclosure to describe embodiments of the present disclosure.

| Symbols | Description |
| --- | --- |
| q | An ECC domain parameter; the field size. |
| FR | Field Representation indicator. An indication of the basis used for representing field elements. For the Suite B curves, FR is NULL. |
| a, b | ECC domain parameters; two field elements that define the equation of an elliptic curve. |
| SEED | An ECC domain parameter; an initialization value that is used during domain parameter generation that can also be used to provide assurance at a later time that the resulting domain parameters were generated arbitrarily. |

-continued

| Symbols | Description |
| --- | --- |
| G | An ECC domain parameter, which is a distinguished point on an elliptic curve that generates the subgroup of order n. |
| h | An ECC domain parameter; the cofactor, which is the order of the elliptic curve divided by the order of the point G. For the Suite B curves, h = 1. |
| n | An ECC domain parameter; the order of the point G. |
| D | The set of ECC domain parameters, (q, FR, a, b{, SEED}, G, n, h). |
| $d_{e,A}, d_{e,B}$ | Party A's and Party B's ephemeral private keys. These are integers in the range [1, n − 1]. |
| $d_{s,A}, d_{s,B}$ | Party A's and Party B's static private keys. These are integers in the range [1, n − 1]. |
| O | The point at infinity; a special point in an elliptic curve group that serves as the (additive) identity. |
| $Q_{e,A}, Q_{e,B}$ | Party A's and Party B's ephemeral public keys. These are points on the elliptic curve defined by the domain parameters. |
| $Q_{s,A}, Q_{s,B}$ | Party A's and Party B's static public keys. These are points on the elliptic curve defined by the domain parameters. |
| $x_p, y_p$ | Elements of the finite field of size q, representing, respectively, the x and y coordinates of a point P. For Suite B curves, these are integers in the interval [0, q − 1]. |
| Z | A shared secret that is used to derive secret keying material using a key derivation function. |

Elliptic Curve Diffie-Hellman Schemes

ECDH is recommended by the NSA in their Suite B cryptography guidelines [6]. More precisely, Suite B recommends the use of Ephemeral Unified ECDH (EU-ECDH) and One-Pass ECDH (OP-ECDH). These two ECDH schemes are described in the Suite B implementer's guide [7]. In the Ephemeral Unified scheme, each party generates an ephemeral key pair each time they want to compute a new shared secret. In the One-Pass scheme, an ephemeral key pair is generated by only one party; the other party uses a static key pair, which may be reused in the computation of many shared secrets. The implementer's guide states that EU-ECDH is preferred over OP-ECDH; however, there are some scenarios where EU-ECDH cannot be used. This is the case, for example, in store-and-forward communication systems where one party is not available to contribute an ephemeral public key. In scenarios like this, OP-ECDH can be used.

Exposure of Sensitive Parameters

In both the EU-ECDH and OP-ECDH schemes, there are two main phases of computation: key pair generation and shared secret computation. The steps required in each phase are described in detail in the implementer's guide [7]; however, the computations in those steps leak sensitive parameters to white-box attackers.

The procedure for key pair generation in [7] specifies that the key pair (private key $d_A$ and public key $Q_A$) be generated based on a random number r as follows: $d_A$=r+1, and $Q_A$=$d_A$G. Note that "$d_A$G" denotes the elliptic curve point formed by adding the generator G to itself $d_A$ times. The procedure for shared secret computation specifies that the shared secret, Z, be computed as the x-coordinate of an elliptic curve point P defined as follows: P=$d_A Q_B$=(r+1)$Q_B$, where $d_A$ is party A's private key and $Q_B$ is party B's public key.

Straightforward implementations of key pair generation and shared secret computation on party A's device will expose the secret key $d_A$ in that device's memory. This is apparent for the computations that produce $d_A$=r+1, $Q_A$=$d_A$G, and P=$d_A Q_B$. Thus, a white-box attacker that examines memory-dumps of party A's device will be able to deduce the private key, $d_A$, as well as the shared secret, Z. To maintain security against white-box attackers, the computations executed for key pair generation and shared secret computation must be protected.

DETAILED DESCRIPTION OF THE PREFERRED EMBODIMENT

Figure 2:
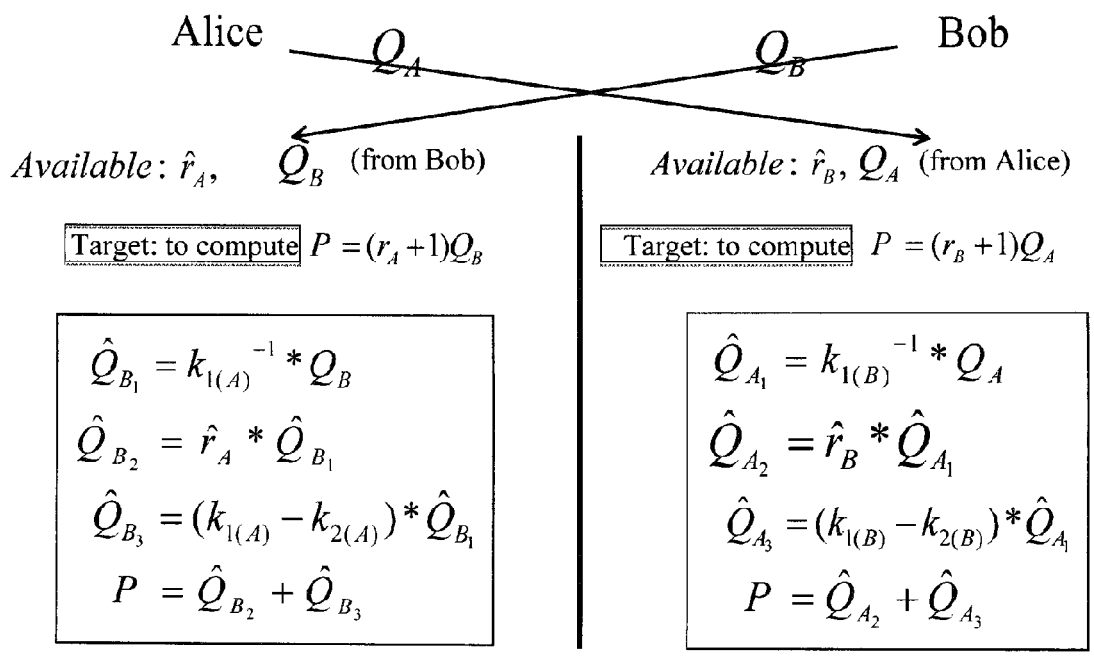
FIG. 2 illustrates shared secret generation for White-Box Elliptic Curve Diffie-Hellman (WB-ECDH) in accordance with the first embodiment of the present disclosure.

FIG. 1 illustrates the process of key pair generation for our proposed White-Box Elliptic Curve Diffie-Hellman (WB-ECDH) implementation, in accordance with a first embodiment of the present disclosure. FIG. 2 illustrates the process of shared secret computation.

Key Pair Generation.

Each static and ephemeral private key d and public key Q shall be generated using the appropriate domain parameters, D, which must be selected from one of the two sets of domain parameters specified in the list of Suite B elliptic curves and domain parameters (see Appendix A of [7]). Henceforth, we assume that domain parameters have been appropriately selected.

Target:

Compute Q=dG without disclosing d inside the memory of one party's machine, where Q=dG=(r+1)G, r is the random number. Q is the public key, and may represent any one of $Q_{e,A}$, $Q_{e,B}$ or $Q_{s,B}$ depending on the particular ECDH scheme (EU-ECDH or OP-ECDH). d is the private key, and, similarly, it may represent any one of $d_{e,A}$, $d_{e,B}$ or $d_{s,B}$.

Transformed Random Number:

In this embodiment, the transformation t of a random number r is denoted as $\hat{r}$ and defined as $\hat{r}=t(r)=k_1 r+k_2$ mod n, where $k_1$ and $k_2$ are two instance-specific, compile time, random numbers and $k_1, k_2 \in Z_n^*$ (note that $Z_n^*$ denotes the set of integers in the range 1 to n−1 that are relatively prime to the domain parameter n). Thus, $\hat{r}=k_1 r+k_2$ mod n and $r=k_1^{-1}\hat{r}-k_2 k_1^{-1}$ mod n. It is important to note that the output of the random bit generator (RBG) used in key pair generation is interpreted as producing transformed random numbers. This means that the transformation t(r) does not have to be explicitly applied by the implementation—the transformation is implicit in the way in which the output of the RBG is interpreted.

Precomputation:

Once the instance-specific, compile time, random numbers $k_1$ and $k_2$ are selected, two auxiliary elliptic curve points are pre-computed: $\hat{G}=k_1^{-1}G$ and $U_2=(k_1-k_2)\hat{G}$. These two points are computed during an off-line set-up phase where the implementation is not subject to white-box attacks (e.g. at compilation time).

The steps of key pair generation are as follows:

Input:

None.

Output:

1. Status: The status returned from the key pair generation procedure. The status will indicate SUCCESS or an ERROR.
2. $\hat{r}$ A transformed random number.
3. Q: The generated public key.

Process:

1. Set N=len(n) (i.e. set N equal to the bit length of the domain parameter n). Check that N is valid, that is, N=256 or N=384 (the only valid lengths for Suite B).
2. If N is invalid, then return an ERROR indication.
3. Set requested_security_strength=the security strength associated with N (either 128 when using P-256 or 192 when using P-384).
4. Obtain a string of N bits ($b'_1, b'_2, \ldots, b'_N$) from a Random Bit Generator (RBG) with a security strength of requested_security_strength or more, which generates the transformed random number $\hat{r}=k_1 r+k_2$ mod n. If an ERROR indication is returned, then return the ERROR indication.
5. Compute $U_1=\hat{r}\hat{G}$ (recall that $\hat{G}=k_1^{-1}G$ was precomputed).
6. Compute $Q=U_1+U_2$ (recall that $U_2=(k_1-k_2)\hat{G}$ was precomputed).
7. Return SUCCESS, $\hat{r}$ and Q.

Verification:

It can be shown that the previous procedure produces a public key that is compatible with the original procedure given in [7]. The original procedure produces a public key Q=(r+1)G; for the new procedure, we have $$Q = U_1 + U_2$$
$$= \hat{r}\hat{G} + (k_1 - k_2)\hat{G}$$
$$= \hat{r}k_1^{-1}G + (k_1 - k_2)k_1^{-1}G$$
$$= (k_1^{-1}\hat{r} - k_2 k_1^{-1} + k_1 k_1^{-1})G$$
$$= (k_1^{-1}\hat{r} - k_2 k_1^{-1} + 1)G$$
$$= (r+1)G$$

Cost:

In our proposed key pair generation procedure, the cost of elliptic curve computations is as follows. Three elliptic curve point multiplications are required, two of which are offline and one is online. One elliptic curve point addition is required.

Shared Secret Computation.

Party A computes the shared secret Z, which is the x-coordinate of an elliptic curve point, using the appropriate domain parameters D, party B's public key ($Q_B$), and their transformed random number $\hat{r}_A$. Party B computes the shared secret in an analogously, using party A's public key and their own transformed random number. We continue Target:

Compute $P=(r_A+1)Q_B$ without disclosing $r_A$ (party A's random number) inside the memory of party A's machine.

Precomputation:

Let $k_{1(A)}$ and $k_{2(A)}$ denote party A's instance-specific, compile time, random numbers. Party A should pre-compute the integer values $s=k_{1(A)}^{-1}$ mod n and $t=k_{1(A)}-k_{2(A)}$ mod n. These two values are computed during an off-line set-up phase where the implementation is not subject to white-box attacks (e.g. at compilation time). If party B's public key is known in advance, as is the case in OP-ECDH, then further pre-computation can be done. When doing OP-ECDH, the elliptic curve points $\hat{Q}_{B_1}=sQ_B=k_{1(A)}^{-1}Q_B$ and $\hat{Q}_{B_3}=t\hat{Q}_{B_1}=(k_{1(A)}-k_{2(A)})\hat{Q}_{B_1}$ should be computed off-line.

The steps of shared secret computation are as follows:

Input:

1. $\hat{r}_A$: Party A's transformed random number (recall that $r_A=k_{1(A)}^{-1}\hat{r}_A-k_{2(A)}k_{1(A)}^{-1}$ mod n).
2. $Q_B$: The other party's (party B) public key.

Output:
The shared secret Z or an error indicator.
Process:
1. Compute points $\hat{Q}_{B_1} = sQ_B = k_{1(A)}^{-1} Q_B$; $\hat{Q}_{B_2} = \hat{r}_A \hat{Q}_{B_1}$; and $\hat{Q}_{B_3} = t\hat{Q}_{B_1} = (k_{1(A)} - k_{2(A)})\hat{Q}_{B_1}$
2. Compute $P = \hat{Q}_{B_2} + \hat{Q}_{B_3}$
3. If P=O, the point at infinity, output an error indicator.
4. $Z = x_P$ where $x_P$ is the x-coordinate of P.

Verification:
It can be shown that the previous procedure, which is summarized in FIG. 2, produces a shared secret that is compatible with the original procedure given in [7]. The original procedure produces a shared secret equal to $(r_A+1)Q_B$; for the new procedure, we have $$P = \hat{Q}_{B_2} + \hat{Q}_{B_3}$$
$$= \hat{r}_A \hat{Q}_{B_1} + (k_{1(A)} - k_{2(A)})\hat{Q}_{B_1}$$
$$= \hat{r}_A k_{1(A)}^{-1} Q_B - k_{2(A)} k_{1(A)}^{-1} Q_B + k_{1(A)} k_{1(A)}^{-1} Q_B$$
$$= (k_{1(A)}^{-1} \hat{r}_A - k_{2(A)} k_{1(A)}^{-1} + k_{1(A)} k_{1(A)}^{-1}) Q_B$$
$$= (r_A + 1) Q_B$$

Cost:
In our proposed shared secret computation procedure, the cost of elliptic curve computations is as follows. Three elliptic curve point multiplications required. For OP-ECDH, two of the point multiplications are off-line and one is online; for EU-ECDH, all three point multiplications are online. One elliptic curve point addition is required.

Figure 3:
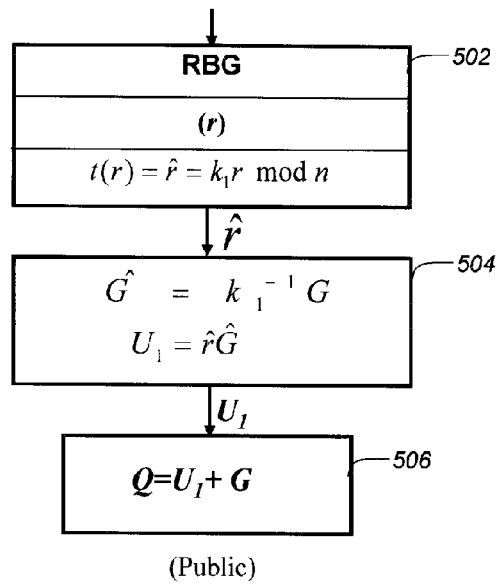
FIG. 3 illustrates public key generation for White-Box Elliptic Curve Diffie-Hellman (WB-ECDH) in accordance with a second embodiment of the present disclosure.
Figure 4:
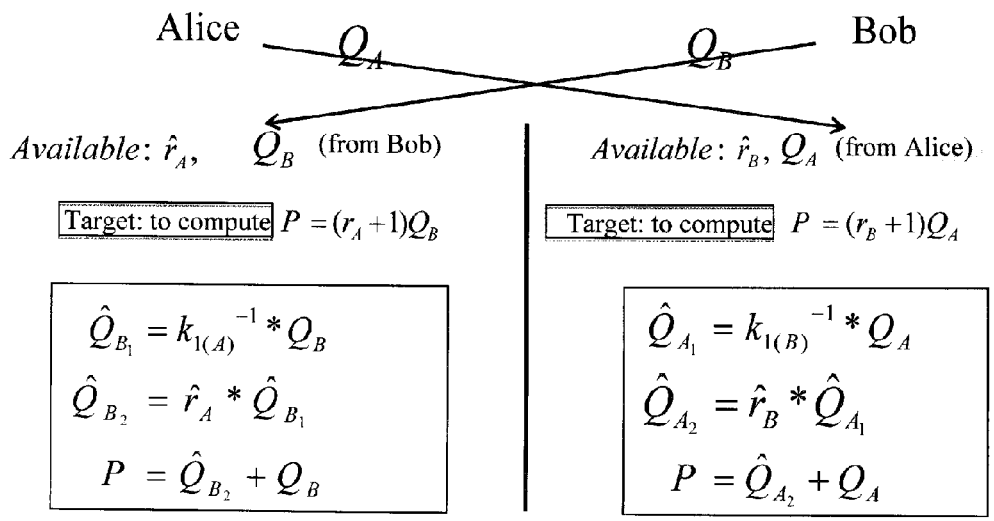
FIG. 4 illustrates shared secret generation for White-Box Elliptic Curve Diffie-Hellman (WB-ECDH) in accordance with the second embodiment of the present disclosure.

The second embodiment of the disclosure is a reduced version of the first embodiment. The second embodiment is described with reference to FIGS. 3 and 4. The main concern in this design is computational efficiency.

Key Pair Generation.
We now describe key pair generation.
Target:
Compute Q=dG without disclosing d inside the memory of one party's machine.
Transformed Random Number:
In this embodiment, the transformation of the random number r is defined as $\hat{r} = t(r) = k_1 r$ mod n, where $k_1$ is an instance specific, compile time random number selected from the set $Z_n^*$. Thus, $\hat{r} = k_1 r$ mode and $r = k_1^{-1} \hat{r}$ mod n.

Precomputation:
Once the instance-specific, compile time, random number $k_1$ is selected, an auxiliary elliptic curve point is pre-computed: $\hat{G} = k_1^{-1} G$. As in the first embodiment, this point should be computed during an off-line set-up phase where the implementation is not subject to white-box attacks (e.g. at compilation time).

The steps of key pair generation are as follows:
Input and Output are the same as that of the first embodiment.
Process:
1. Steps 1, 2 and 3 are the same as of the first embodiment.
4. Obtain a string of N bits $(b'_1, b'_2, \ldots, b'_N)$ from a Random Bit Generator (RBG) with a security strength of requested_security_strength or more, which generates the transformed random number $\hat{r} = k_1 r$ mod n. If an ERROR indication is returned, then return the ERROR indication.
5. Compute $U_1 = \hat{r}\hat{G}$ (recall that $\hat{G} = k_1^{-1} G$ was pre-computed).
6. Compute $Q = U_1 + G$
7. Return SUCCESS, $\hat{r}$ and Q.

Verification:
The following sequence of identities show that the previous procedure produces a public key that is compatible with the original procedure given in [7]:

$$Q = U_1 + G$$
$$= \hat{r} * \hat{G} + G$$
$$= \hat{r} * k_1^{-1} * G + G$$
$$= (k_1^{-1} * \hat{r} + 1) * G$$
$$= (r + 1) G$$

Cost:
The costs of elliptic curve computations for key pair generation are now as follows. Two elliptic curve point multiplications are required (one online and one offline). One elliptic curve point addition is required.

Shared Secret Computation:
We explain shared secret computation from the perspective of Party A. Party A will use the appropriate domain parameters D, the other party's public key ($Q_B$), and their transformed random number $\hat{r}_A$ to compute Z, which is the x-coordinate of an elliptic curve point P.

Target:
Compute $P = (r_A+1)Q_B$ without disclosing $r_A$ inside the memory of party A's machine.

Precomputation:
Let $k_{1(A)}$ denote party A's instance-specific, compile time, random number. Party A should pre-compute the integer values $s = k_{1(A)}^{-1}$ mod n. This value should be computed during an off-line set-up phase where the implementation is not subject to white-box attacks (e.g. at compilation time). If party B's public key is known in advance, as is the case in OP-ECDH, then further pre-computation can be done. When doing OP-ECDH, the elliptic curve point $\hat{Q}_{B_1} = sQ_B = k_{1(A)}^{-1} Q_B$ should be computed off-line.

The steps are as follows:
Input:
1. $\hat{r}_A$: Party A's transformed random number (recall that $r_A = k_{1(A)}^{-1} \hat{r}_A$ mod n).
2. $Q_B$: The other party's (party B) public key.
Output:
The shared secret Z or an error indicator.
Process:
1. Compute points $\hat{Q}_{B_1} = sQ_B = k_{1(A)}^{-1} Q_B$; and $\hat{Q}_{B_2} = \hat{r}_A \hat{Q}_{B_1}$
2. $P = \hat{Q}_{B_2} + Q_B$
3. If P=O, the point at infinity, output an error indicator.
4. $Z = x_P$ where $x_P$ is the x-coordinate of P.

Verification:
It can be shown that the previous procedure, which is summarized in FIG. 4, produces a shared secret that is compatible with the original procedure given in [7]. Consider the following sequence of identities:

$$P = \hat{Q}_{B_2} + Q_B$$
$$= \hat{r}_A * \hat{Q}_{B_1} + Q_B$$
$$= \hat{r}_A * k_{1(A)}^{-1} * Q_B + Q_B$$

-continued $$= (k_{1(A)}^{-1} * \hat{r}_A + 1) * Q_B$$

$$= (r_A + 1) * Q_B$$

Cost:

The costs of elliptic curve computations for shared secret computation are now as follows. Two elliptic curve point multiplications are required. For OP-ECDH, one point multiplication is off-line and one is online. For EU-ECDH, both point multiplications are online. One elliptic curve point addition is required (for both OP-ECDH and EU-ECDH).

The second embodiment is a reduced version of the first embodiment. One instance specific random number is removed from the first embodiment, which reduces the number of elliptic curve computations, but possibly sacrifices security strength. This methodology is suitable for those applications where computational efficiency is a prime concern.

The third embodiment is described with reference to FIGS. 5 and 6.

Key Pair Generation:

The third embodiment is an enhanced version of the first embodiment where security strength is a prime concern. The computational cost of this embodiment is higher.

Target:

Compute Q=dG without disclosing d inside the memory of one party's machine.

Transformed Random Numbers:

In this methodology, the Random Bit Generator generates two transformed random numbers $\hat{r}_{11}$ and $\hat{r}_{22}$ that, in combination, encode two random numbers $r_1$ and $r_2$. The resultant public key, Q, may be generated using either $r_1$ or $r_2$, and this choice may be made at runtime within the key pair generation procedure. Thus, our proposed procedure can compute Q=dG=($r_1$+1)G or Q=dG=($r_2$+1)G. The values $\hat{r}_{11}$ and $\hat{r}_{22}$ output by the RBG are interpreted as being produced by two layers of transformations. One layer corresponds to the same transformation technique of the first embodiment; namely, a linear transform using instance specific, compile time random numbers drawn from the set $Z_n^*$. The second layer is a pseudo-Hadamard transformation [11], which ensures that $r_1$ and $r_2$ can only be recovered from the combination of both $\hat{r}_{11}$ and $\hat{r}_{22}$.

More precisely, $\hat{r}_{11}$ and $\hat{r}_{22}$ are interpreted as follows:

$$\hat{r}_{11} = \hat{r}_1 + \hat{r}_2 \bmod 2^N$$

$$\hat{r}_{22} = \hat{r}_1 + 2\hat{r}_2 \bmod 2^N.$$

We interpret $\hat{r}_{11}$ and $\hat{r}_{22}$ as being the result of a pseudo-Hadamard transform applied to the values $\hat{r}_1$ and $\hat{r}_2$. Note that N is equal to the bit length of the domain parameter n, and $\hat{r}_1$ and $\hat{r}_2$ are transformed values that encode $r_1$ and $r_2$ respectively. To recover $\hat{r}_2$ from $\hat{r}_{11}$ and $\hat{r}_{22}$, we compute $\hat{r}_{22} - \hat{r}_{11} \bmod 2^N$; and to recover $\hat{r}_1$ we compute $2\hat{r}_{11} - \hat{r}_{22} \bmod 2^N$. The definition of $\hat{r}_1$ and $\hat{r}_2$ is $$\hat{r}_1 = k_{11} r_1 + k_{12} \bmod n$$

$$\hat{r}_2 = k_{21} r_2 + k_{22} \bmod n$$

Here, $k_{11}$, $k_{12}$, $k_{21}$, $k_{22}$ are instance specific, compile time random numbers drawn from the set $Z_n^*$. As in the first embodiment, we have $r_1 = k_{11}^{-1}\hat{r}_1 - k_{12}k_{11}^{-1} \bmod n$ and $r_2 = k_{21}^{-1}\hat{r}_2 - k_{22}k_{21}^{-1} \bmod n$.

Precomputation:

Once the instance-specific, compile time, random numbers $k_{11}$, $k_{12}$, $k_{21}$, $k_{22}$ are selected, two sets of auxiliary elliptic curve points are pre-computed: $\hat{G}_{11} = k_{11}^{-1}G$, $\hat{G}_{12} = k_{11}^{-1}\hat{G}_{11}$, $U_{12} = (k_{11} - k_{12})\hat{G}_{11}$ and $\hat{G}_{21} = k_{21}^{-1}G$, $\hat{G}_{22} = k_{21}^{-1}\hat{G}_{21}$, $U_{22} = (k_{21} - k_{22})\hat{G}_{21}$. As in the first embodiment, these points should be computed during an off-line set-up phase where the implementation is not subject to white-box attacks (e.g. at compilation time).

The steps of key pair generation are as follows:

Input and Output are the same as that of the first embodiment.

Process:

1. Steps 1, 2 and 3 are the same as that of the first embodiment.
2. Obtain strings of N bits (b'$_{11}$, b'$_{12}$, ..., b'$_{1N}$) and (b'$_{21}$, b'$_{22}$, ..., b'$_{2N}$) from a Random Bit Generator (RBG) with a security strength of requested_security_strength or more, which generates the transformed random numbers $\hat{r}_{11} = (\hat{r}_1 + \hat{r}_2) \bmod 2^N$ and $\hat{r}_{22} = (\hat{r}_1 + 2\hat{r}_2) \bmod 2^N$. If an ERROR indication is returned, then return the ERROR indication.
3. If ("$r_1$" is chosen), then
   a. Compute $u_{11} = (2\hat{r}_{11} - \hat{r}_{22} \bmod 2^N)k_{11} \bmod n$.
   b. Compute $Q = u_{11}\hat{G}_{12} + U_{12}$ (recall that $\hat{G}_{12}$ and $U_{12}$ were pre-computed)
4. If ("$r_2$" is chosen), then
   c. Compute $u_{21} = (\hat{r}_{22} - \hat{r}_{11} \bmod 2^N)k_{21}$.
   d. $Q = u_{21} * \hat{G}_{22} + U_{22}$ (recall that $\hat{G}_{22}$ and $U_{22}$ were pre-computed)
5. Return SUCCESS, $\hat{r}_{11}$, $\hat{r}_{22}$ and Q.

Figure 5:
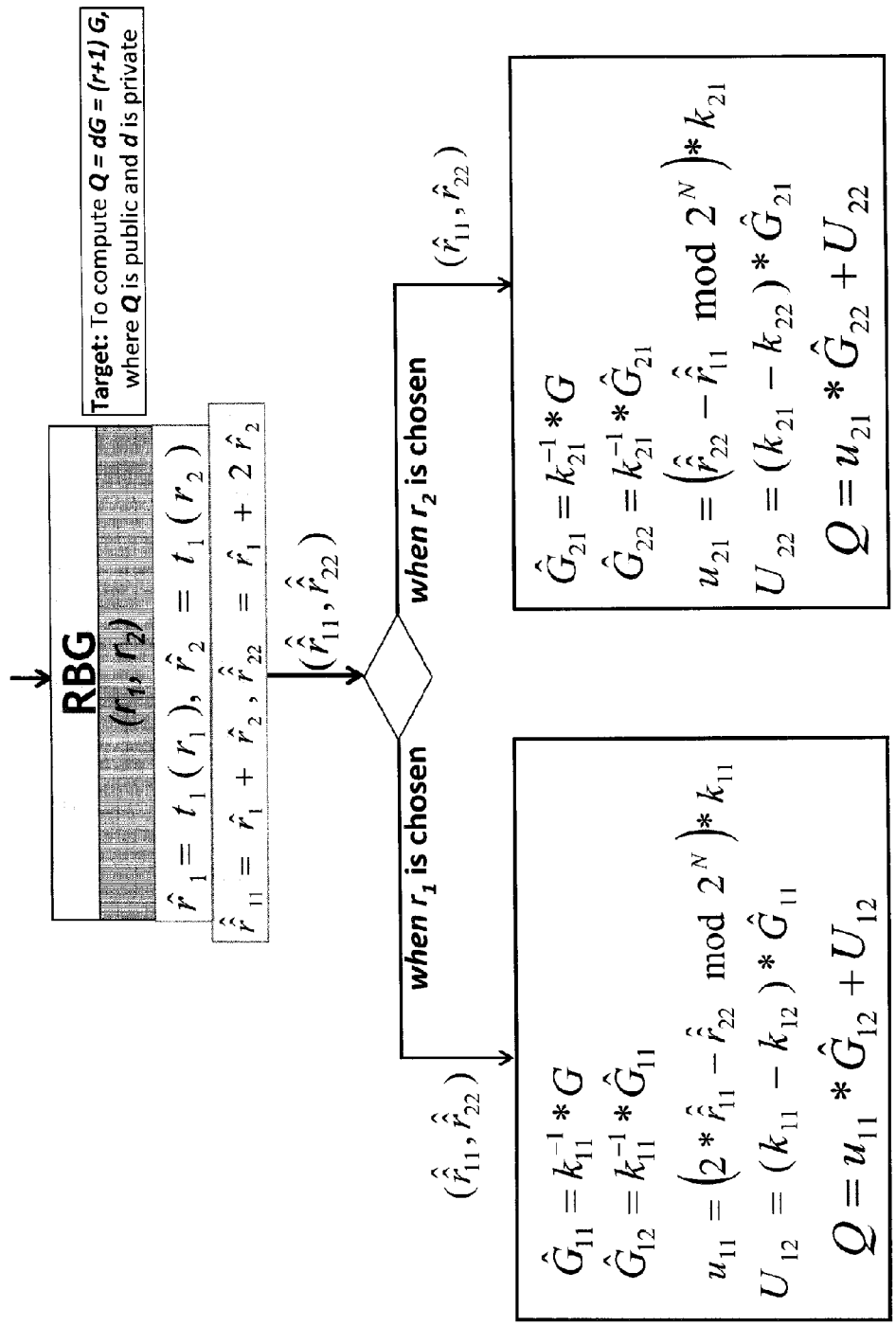
FIG. 5 illustrates public key generation for White-Box Elliptic Curve Diffie-Hellman (WB-ECDH) in accordance with a third embodiment of the present disclosure.

Verification:

The procedure is illustrated in FIG. 5 and it can be verified that the resultant Q is equal to either ($r_1$+1)G or ($r_2$+1)G as follows:

$$Q = u_{11}\hat{G}_{12} + U_{12}$$
$$= (2\hat{r}_{11} - \hat{r}_{22} \bmod 2^N)k_{11}k_{11}^{-1} * \hat{G}_{11} + U_{12}$$
$$= \hat{r}_1 k_{11}^{-1} G + (k_{11} - k_{12})\hat{G}_{11}$$
$$= (k_{11}^{-1}\hat{r}_1 - k_{12}k_{11}^{-1} + k_{11}k_{11}^{-1})G$$
$$= (r_1 + 1)G$$

$$Q = u_{21} * \hat{G}_{22} + U_{22}$$
$$= (\hat{r}_{22} - \hat{r}_{11} \bmod 2^N) * k_{21} * k_{21}^{-1} * \hat{G}_{21} + U_{22}$$
$$= \hat{r}_2 * k_{21}^{-1} * G + (k_{21} - k_{22}) * \hat{G}_{21}$$
$$= (k_{21}^{-1} * \hat{r}_2 - k_{22} * k_{21}^{-1} + k_{21} * k_{21}^{-1}) * G$$
$$= (r_2 + 1)G$$

Shared Secret Computation:

We explain shared secret computation from the perspective of Party A. Party A will use the appropriate domain parameters D, the other party's public key ($Q_B$), and their own transformed random numbers $\hat{r}_{11(A)}, \hat{r}_{22(A)}$ to compute Z.

Target:

Without disclosing $r_{1(A)}$ and $r_{2(A)}$ inside the memory of the party A's machine, compute $P = (r_{1(A)} + 1)Q_B$ or $P = (r_{2(A)} + 1)Q_B$ depending on whether $r_{1(A)} + 1$ or $r_{2(A)} + 1$ was selected as party A's private key.

Precomputation:

Let $k_{11(A)}$, $k_{12(A)}$, $k_{21(A)}$, $k_{22(A)}$ denote party A's instance-specific, compile time, random numbers. Party A should pre-compute the integer values $s_1 = k_{11(A)}^{-1} \mod n$ and $s_2 = k_{21(A)}^{-1} \mod n$. These values should be computed during an off-line set-up phase where the implementation is not subject to white-box attacks (e.g. at compilation time). If party B's public key is known in advance, as is the case in OP-ECDH, then further pre-computation can be done. When doing OP-ECDH, the elliptic curve points $\hat{Q}_{B_{11}} = s_1 Q_B = k_{11(A)}^{-1} Q_B$, $\hat{Q}_{B_{12}} = (k_{11(A)} - k_{12(A)})\hat{Q}_{B_{11}}$, $\hat{Q}_{B_{21}} = s_2 Q_B = k_{21(A)}^{-1} Q_B$, and $\hat{Q}_{B_{22}} = (k_{21(A)} - k_{22(A)})\hat{Q}_{B_{21}}$ should be computed off-line.

The steps are as follows:

Input:

1. $\hat{r}_{11(A)}, \hat{r}_{22(A)}$: Party A's transformed random numbers.

2. $Q_B$: The other party's (party B) public key.

Output:

The shared secret Z or an error indicator.

Process:

1. If ("$r_1$" was chosen), then
   A. Compute $\hat{Q}_{B_{11}} = s_1 Q_B$, $\hat{Q}_{B_{12}} = (k_{11(A)} - k_{12(A)})\hat{Q}_{B_{11}}$ and $\hat{Q}_{B_{13}} = (2\hat{r}_{11(A)} - \hat{r}_{22(A)} \mod 2^N)\hat{Q}_{B_{11}}$ (recall that $s_1$ was pre-computed).
   B. $P = \hat{Q}_{B_{12}} + \hat{Q}_{B_{13}}$
   C. If P=O, the point at infinity, output an error indicator.
   D. $Z = x_P$ where $x_P$ is the x-coordinate of P.

2. If ("$r_2$" was chosen), then
   A. Compute $\hat{Q}_{B_{21}} = s_2 Q_B$, $\hat{Q}_{B_{22}} = (k_{21(A)} - k_{22(A)})\hat{Q}_{B_{21}}$ and $\hat{Q}_{B_{23}} = (\hat{r}_{22(A)} - \hat{r}_{11(A)} \mod 2^N)\hat{Q}_{B_{21}}$ (recall that $s_2$ was pre-computed).
   B. $P = \hat{Q}_{B_{22}} + \hat{Q}_{B_{23}}$
   C. If P=O, the point at infinity, output an error indicator.
   D. $Z = x_P$ where $x_P$ is the x-coordinate of P.

Verification:

The procedure is illustrated in FIG. 6. The correctness of the procedure can be verified as follows:

$$P = \hat{Q}_{B_{12}} + \hat{Q}_{B_{13}}$$
$$= \hat{Q}_{B_{12}} + \left(2 * \hat{r}_{11(A)} - \hat{r}_{22(A)} \mod 2^N\right) * \hat{Q}_{B_{11}}$$
$$= (k_{11(A)}^{-1} * \hat{r}_{1(A)} - k_{12(A)} * k_{11(A)}^{-1} + k_{11} * k_{11}^{-1}) * Q_B$$
$$= (r_{1(A)} + 1) Q_B$$

$$P = \hat{Q}_{B_{22}} + \hat{Q}_{B_{23}}$$
$$= \hat{Q}_{B_{22}} + \left(\hat{r}_{22(A)} - \hat{r}_{11(A)} \mod 2^N\right) * \hat{Q}_{B_{21}}$$
$$= (k_{21(A)}^{-1} * \hat{r}_{2(A)} - k_{22(A)} * k_{21(A)}^{-1} + k_{21} * k_{21}^{-1}) * Q_B$$
$$= (r_{2(A)} + 1) Q_B$$

The third embodiment may be the most resistant to white-box attacker. In this embodiment, two random numbers use to make it more difficult for the attacker to follow the execution path of the program. Furthermore, two transformations are used to mask the random numbers. As a result, computational efficiency is degraded. The third embodiment is suitable for those applications where security strength is the main concern.

The fourth embodiment is described with reference to FIGS. 7 and 8.

Key Pair Generation:

The fourth embodiment is an enhanced version of the second embodiment.

Target:

Compute Q=dG without disclosing d inside the memory of one party's machine.

Transformed Random Numbers:

As was done the in third embodiment, the fourth embodiment uses the random bit generator to generate two transformed random numbers $\hat{r}_{11}$ and $\hat{r}_{22}$ that, in combination, encode two random numbers $r_1$ and $r_2$. The resultant public key, Q, may be generated using either $r_1$ or $r_2$, and this choice may be made at runtime within the key pair generation procedure. The values $\hat{r}_{11}$ and $\hat{r}_{22}$ output by the RBG are interpreted as being produced by two layers of transformations. One layer corresponds to the transformation technique of the second embodiment; namely, a linear transform using instance specific, compile time random numbers drawn from the set $Z_n^*$. The second layer is a pseudo-Hadamard transformation, as in the third embodiment.

More precisely, $\hat{r}_{11}$ and $\hat{r}_{22}$ are interpreted as follows:

$$\hat{r}_{11} = \hat{r}_1 + \hat{r}_2 \mod 2^N$$

$$\hat{r}_{22} = \hat{r}_1 + 2\hat{r}_2 \mod 2^N.$$

We interpret $\hat{r}_{11}$ and $\hat{r}_{22}$ as being the result of a pseudo-Hadamard transform applied to the values $\hat{r}_1$ and $\hat{r}_2$. Note that N is equal to the bit length of the domain parameter n, and $\hat{r}_1$ and $\hat{r}_2$ are transformed values that encode $r_1$ and $r_2$ respectively. To recover $\hat{r}_2$ from $\hat{r}_{11}$ and $\hat{r}_{22}$, we compute $\hat{r}_{22} - \hat{r}_{11} \mod 2^N$; and to recover $\hat{r}_1$ we compute $2\hat{r}_{11} - \hat{r}_{22} \mod 2^N$. The definition of $\hat{r}_1$ and $\hat{r}_2$ is $$\hat{r}_1 = k_{11} r_1 \mod n$$

$$\hat{r}_2 = k_{21} r_2 \mod n$$

Here, $k_{11}$, $k_{21}$ are instance specific, compile time random numbers drawn from the set $Z_n^*$. As in the second embodiment, we have $r_1 = k_{11}^{-1} \hat{r}_1 \mod n$ and $r_2 = k_{21}^{-1} \hat{r}_2 \mod n$.

Precomputation:

Once the instance-specific, compile time, random numbers $k_{11}, k_{21}$ are selected, two sets of auxiliary elliptic curve points are pre-computed: $\hat{G}_{11} = k_{11}^{-1} G$, $\hat{G}_{12} = k_{11}^{-1} \hat{G}_{11}$ and $\hat{G}_{21} = k_{21}^{-1} G$, $\hat{G}_{22} = k_{21}^{-1} \hat{G}_{21}$. As in the first embodiment, these points should be computed during an off-line set-up phase where the implementation is not subject to white-box attacks (e.g. at compilation time).

The steps of key pair generation are as follows:

Input and Output are the same as that of the third embodiment.

Process:

1. Steps 1, 2 and 3 are the same as that of the first embodiment.

4. Obtain strings of N bits ($b'_{11}$, $b'_{12}$, ..., $b'_{1N}$) and ($b'_{21}$, $b'_{22}$, ..., $b'_{2N}$) from a Random Bit Generator (RBG) with a security strength of requested_security_strength or more, which generates the transformed random numbers $\hat{r}_{11} = (\hat{r}_1 + \hat{r}_2) \mod 2^N$ and $\hat{r}_{22} = (\hat{r}_1 + 2\hat{r}_2) \mod 2^N$. If an ERROR indication is returned, then return the ERROR indication, and Invalid_Q.

5. If ("$r_1$") is chosen, then
   a. Compute $u_{11} = (2\hat{r}_{11} - \hat{r}_{22} \mod 2^N) k_{11}$
   b. Compute $Q = u_{11} \hat{G}_{12} + G$ (recall that $\hat{G}_{12}$ was pre-computed).

6. If ("$r_2$" is chosen), then
   a. Compute $u_{21} = (\hat{r}_{22} - \hat{r}_{11} \bmod 2^N)k_{21}$
   b. $Q = u_{21} * \hat{G}_{22} + G$ (recall that $\hat{G}_{22}$ was pre-computed).
7. Return SUCCESS, $\hat{r}_{11}$, $\hat{r}_{22}$ and Q.

Figure 7:
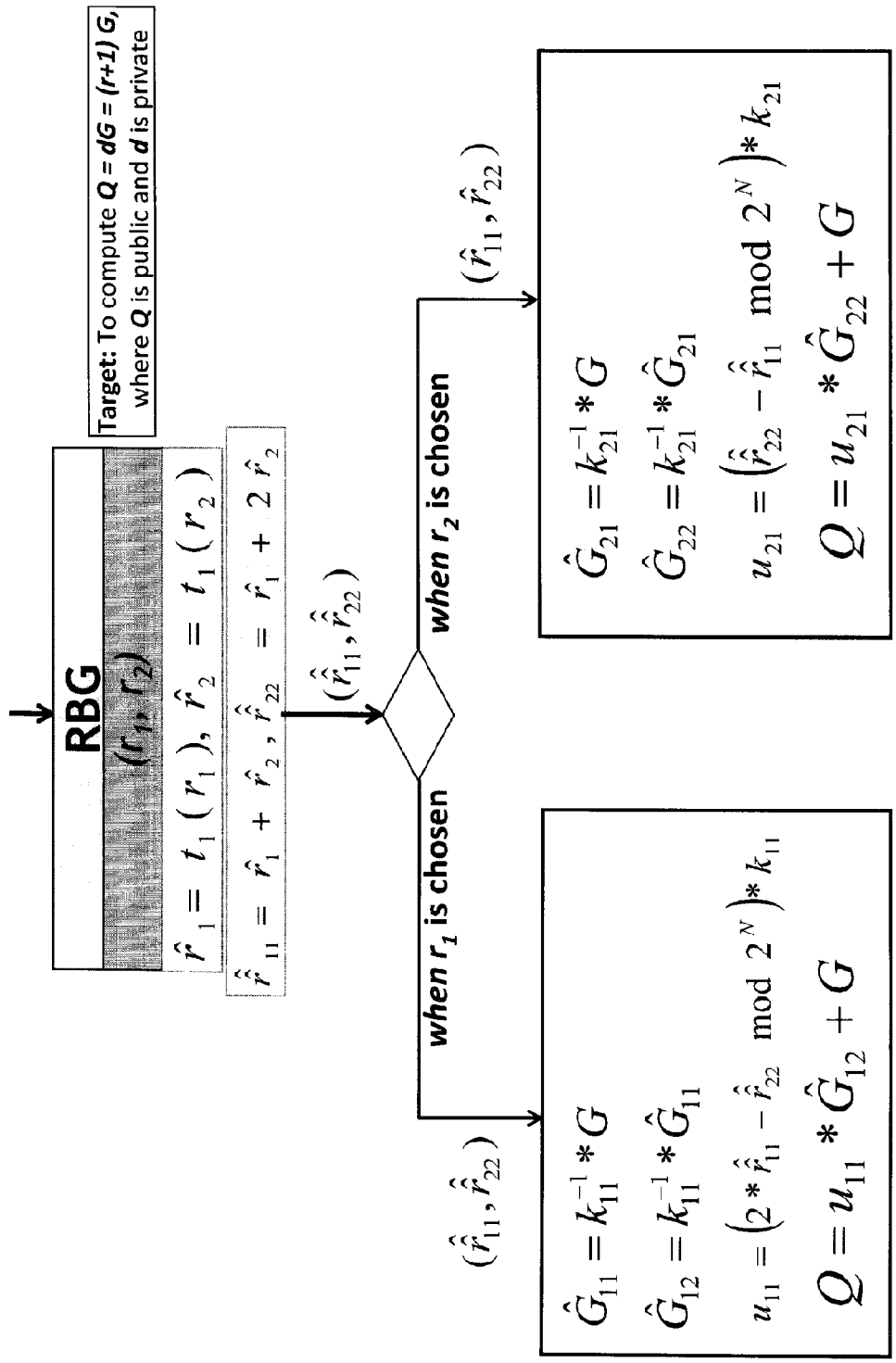
FIG. 7 illustrates public key generation for White-Box Elliptic Curve Diffie-Hellman (WB-ECDH) in accordance with a fourth embodiment of the present disclosure.

Verification:

The computational process is illustrated in FIG. 7. Its correctness can be verified as follows:

$$Q = u_{11} * \hat{G}_{12} + G$$
$$= \left(2 * \hat{r}_{11} - \hat{r}_{22} \bmod 2^N\right) * k_{11} * k_{11}^{-1} * \hat{G}_{11} + G$$
$$= \hat{r}_1 * k_{11}^{-1} * G + G$$
$$= (k_{11}^{-1} * \hat{r}_1 + 1) * G$$
$$= (r_1 + 1)G$$

$$Q = u_{21} * \hat{G}_{22} + G$$
$$= \left(\hat{r}_{22} - \hat{r}_{11} \bmod 2^N\right) * k_{21} * k_{21}^{-1} * \hat{G}_{21} + G$$
$$= \hat{r}_2 * k_{21}^{-1} * G + G$$
$$= (k_{21}^{-1} * \hat{r}_2 + 1) * G$$
$$= (r_2 + 1)G$$

Shared Secret Computation.

As before, we explain shared secret computation from the perspective of Party A. Party A will use the appropriate domain parameters D, the other party's public key ($Q_B$), and their own transformed random numbers $\hat{r}_{11(A)}, \hat{r}_{22(A)}$ to compute Z.

Target:

Without disclosing $r_{1(A)}$ and $r_{2(A)}$ inside the memory of the party A's machine, compute $P=(r_{1(A)}+1)Q_B$ or $P=(r_{2(A)}+1)Q_B$ depending on whether $r_{1(A)}+1$ or $r_{2(A)}+1$ was selected as party A's private key.

Precomputation:

Let $k_{11(A)}$, $k_{21(A)}$ denote party A's instance-specific, compile time, random numbers. Party A should pre-compute the integer values $s_1 = k_{11(A)}^{-1} \bmod n$ and $s_2 = k_{21(A)}^{-1} \bmod n$. These values should be computed during an off-line set-up phase where the implementation is not subject to white-box attacks (e.g. at compilation time). If party B's public key is known in advance, as is the case in OP-ECDH, then further pre-computation can be done. When doing OP-ECDH, the elliptic curve points $\hat{Q}_{B_{11}} = s_1 Q_B = k_{11(A)}^{-1} Q_B$ and $\hat{Q}_{B_{21}} = s_2 Q_B = k_{21(A)}^{-1} Q_B$ should be computed off-line.

The steps of shared secret computation are as follows:

Input:
1. $\hat{r}_{11(A)}, \hat{r}_{22(A)}$: Party A's transformed random numbers.
2. $Q_B$: The other party's (party B) public key.

Output:
The shared secret Z or an error indicator.

Process:
1. If ("$r_1$") was chosen), then
   A. Compute $\hat{Q}_{B_{11}} = s_1 Q_B$ and $\hat{Q}_{B_{12}} = (2\hat{r}_{11(A)} - \hat{r}_{22(A)}) \bmod 2^N) \hat{Q}_{B_{11}}$
   B. Compute $P = \hat{Q}_{B_{12}} + Q_B$
   C. If P=O, the point at infinity, output an error indicator.
   D. $Z = x_P$ where $x_P$ is the x-coordinate of P.
2. If ("$r_2$") was chosen), then
   A. Compute $\hat{Q}_{B_{21}} = s_2 Q_B$; and $\hat{Q}_{B_{22}} = (\hat{r}_{22(A)} - \hat{r}_{11(A)} \bmod 2^N) \hat{Q}_{B_{21}}$
   B. Compute $P = \hat{Q}_{B_2} + Q_B$
   C. If P=O, the point at infinity, output an error indicator.
   D. $Z = x_P$ where $x_P$ is the x-coordinate of P.

Verification:

The computational process is illustrated in FIG. 8. Its correctness can be verified as follows:

$$P = \hat{Q}_{B_{12}} + Q_B$$
$$= \left(2 * \hat{r}_{11(A)} - \hat{r}_{22(A)} \bmod 2^N\right) * \hat{Q}_{B_{11}} + Q_B$$
$$= (k_{11(A)}^{-1} * \hat{r}_{1(A)} + 1) * Q_B$$
$$= (r_{1(A)} + 1)Q_B$$

$$P = \hat{Q}_{B_{22}} + Q_B$$
$$= \left(\hat{r}_{22(A)} - \hat{r}_{11(A)} \bmod 2^N\right) * \hat{Q}_{B_{21}} + Q_B$$
$$= (k_{21(A)}^{-1} * \hat{r}_{2(A)} + 1) * Q_B$$
$$= (r_{2(A)} + 1)Q_B$$

The fourth embodiment attempts to reach a compromise between security and computational efficiency.

Table A shows the computational comparison among the proposed White-Box ECDH design embodiments. Table A allows the four embodiments to be ranked in terms of their computational cost. The embodiments can also be approximately ranked in descending order of security strength as embodiment 3, embodiment 1, embodiment 4, embodiment 2.

Numerous modifications, variations and adaptations may be made to the particular embodiments described above without departing from the scope patent disclosure, which is defined in the claims.

TABLE A

| | | Multiplication (Elliptic Curve Point) | Addition (Elliptic Curve Point) | Subtraction (Scalar) |
|---|---|---|---|---|
| Computational comparison among the proposed White-Box ECDH design methodologies | | | | |
| KEY PAIR GENERATION | EMBODIMENT 1 | 1 (online) 2 (offline) | 1 (online) | 1 |
| | EMBODIMENT 2 | 1 (online) 1 (offline) | 1 (online) | 0 |
| | EMBODIMENT 3 | 1 (online) 3 (offline) Scalar: 2 (for $r_1$) and 1 (for $r_2$) | 1 (online) | 2 |

TABLE A-continued

Computational comparison among the proposed White-Box ECDH design methodologies

| | | | Multiplication (Elliptic Curve Point) | Addition (Elliptic Curve Point) | Subtraction (Scalar) |
|---|---|---|---|---|---|
| | EMBODIMENT 4 | | 1 (online) 2 (offline) Scalar: 2 (for $r_1$) and 1 (for $r_2$) | 1 (online) | 1 |
| | STANDARD BLACK-BOX | | 1 | 0 | 0 |
| SHARED SECRET COMPUTATION | EMBODIMENT 1 | OP-ECDH | 1 (online) 2 (offline) | 1 (online) | 1 |
| | | EU-ECDH | 3 (online) | 1 (online) | 1 |
| | EMBODIMENT 2 | OP-ECDH | 2 (offline) | 1 (online) | 0 |
| | | EU-ECDH | 2 (online) | 1 (online) | 0 |
| | EMBODIMENT 3 | OP-ECDH | 1 (online) 2 (offline) Scalar: 1 (for $r_1$) and 0 (for $r_2$) | 1 (online) | 2 |
| | | EU-ECDH | 3 (online) Scalar: 1 (for $r_1$) and 0 (for $r_2$) | 1 (online) | 2 |
| | EMBODIMENT 4 | OP-ECDH | 1 (online) 1 (offline) Scalar: 1 (for $r_1$) and 0 (for $r_2$) | 1 (online) | 1 |
| | | EU-ECDH | 2 (online) Scalar: 1 (for $r_1$) and 0 (for $r_2$) | 1 (online) | 1 |
| | STANDARD BLACK-BOX | OP-ECDH | 1 (offline) | 0 | 0 |
| | | EU-ECDH | 1 (online) | 0 | 0 |

REFERENCES

[1] S. Chow, P. Eisen, H. Johnson, P. C. Van Oorschot, "White-Box Cryptography and an AES Implementation", In Nyberg, K., Heys, H. M., eds.: Selected Areas in Cryptography 2002 (SAC 2002), Lecture Notes in Computer Science (LNCS), Volume 2595, Springer Verlag, pp. 250-270, 2003.

[2] S. Chow, P. Eisen, H. Johnson, P. C. Van Oorschot, "A White-Box DES Implementation for DRM Applications", In Proceedings of ACM CCS-9 Workshop DRM, Springer, pp. 1-15, 2002.

[3] WB ECDSA, International Patent Application No. PCT/CA2010/000486 filed Mar. 31, 2010.

[4] WB SHA, International Patent Application No. PCT/CA2011/050172 filed Mar. 31, 2011.

[5] W. Diffie, M. Hellman, "New Directions in Cryptography", IEEE Transactions on Information Theory, Vol. 22, Issue. 6, pp. 644-654, November 1976.

[6] NSA Suite B Cryptography, Available from http://www.nsa.gov/ia/programs/suiteb_cryptography/

[7] Suite B Implementer's Guide to NIST SP 800-56A: National institute of Standards and Technology (NIST), July, 2009. (Available at http://www.nsa.gov/ia/_files/SuiteB_Implementer_G-113808.pdf)

[8] Standards for Efficient Cryptography; "SEC 1: Elliptic Curve Cryptography, Version 2.0", Contact: Daniel R. L. Brown, Certicom Research, © 2009 Certicom Corp, May 2009.

[9] D. Hankerson, A. Menezes, S. Vanstone, "Guide to Elliptic Curve Cryptography", Springer-Verlag Publication, ISBN 0-387-95273-X, 2004.

[10] Hitachi Ltd., Intel Corporation, Panasonic Corporation, Sony Corporation, Toshiba Corporation, "Digital Transmission Content Protection Specification Volume 1 (Informational Version)", Revision 1.7, December, 2011.

[11] James L. Massey. "SAFER K-64: A Byte-Oriented Block-Ciphering Algorithm", In Ross Anderson, ed.: Fast Software Encryption '93, Lecture Notes in Computer Science, Volume 809, Springer Verlag, pp. 1-17, 1994.

What is claimed is:

1. A method executed by one or more computing devices for generating a public key for an elliptic curve Diffie-Hellman (ECDH) key exchange protocol without disclosing the private key during computation of the public key, the method comprising the steps of:
   generating, by at least one of the one or more computing devices, a random number;
   interpreting, by at least one of the one or more computing devices, that random number as a linearly transformed random number $\hat{r}$ which results from an application of a linear transformation to an original random number r; and
   generating, by at least one of the one or more computing devices, a public key Q corresponding to a private key d using the linearly transformed random number $\hat{r}$ by computing one or more auxiliary elliptic curve points based at least in part on the linearly transformed number $\hat{r}$ and computing the public key Q based at least in part on the one or more auxiliary elliptic curve points;
   wherein $Q=dG=(r+1)G$, wherein G comprises an elliptic curve generator point, wherein Q is generated without disclosing either d or r within a memory of a computing device generating Q, and wherein the generated public key Q is compatible with the corresponding private key d.

2. The method of claim 1 wherein the linear transformation is $\hat{r}=k_1 r+k_2 \bmod n$ where $k_1$ and $k_2$ are two instance specific, compile time random values and are elements of $Z^*_n$, where n is the order of the point G, and where Z is a shared secret.

3. The method of claim 2 wherein the step of generating a public key computes auxiliary elliptic curve points $\hat{G}=k_1^{-1} G$, $U_1=\hat{r}\hat{G}$, and $U_2=(k_1-k_2)\hat{G}$ and then computes $Q=U_1+U_2$.

4. The method of claim 3, wherein the linearly transformed random number is associated with party A, and further comprising the steps of receiving a public key of party B and deriving a shared secret therefrom using the linearly transformed random number associated with party A.

5. The method of claim 4 wherein the step of deriving the shared secret computes points $\hat{Q}_{B_1}=k_{1(A)}^{-1}\hat{Q}_B$; $\hat{Q}_{B_2}=\hat{r}_A\hat{Q}_{B_1}$; and $\hat{Q}_{B_3}=(k_{1(A)}-k_{2(A)})\hat{Q}_{B_1}$ and then $P=\hat{Q}_{B_2}+\hat{Q}_{B_3}$ where the shared secret is $Z=x_P$ where $x_P$ is the x-coordinate of P, $\hat{r}_A$ comprises the linearly transformed random number associated with party A and $Q_s$ comprises the public key of party B.

6. The method of claim 2 wherein $k_2=0$.

7. The method of claim 6 wherein the step of generating a public key computes auxiliary elliptic curve points $\hat{G}=k_1^{-1}G$, $U_1=\hat{r}\hat{G}$, and then computes $Q=U_1+G$.

8. The method of claim 7 wherein the linearly transformed random number is associated with party A and further comprising the steps of receiving a public key of party B and deriving a shared secret therefrom using the linearly transformed random number associated with party A.

9. The method of claim 8 wherein the step of deriving the shared secret computes points $\hat{Q}_{B_1}=k_{1(A)}^{-1}\hat{Q}_B$; and $\hat{Q}_{B_2}=\hat{r}_A\hat{Q}_{B_1}$ and then $P=\hat{Q}_{B_2}+Q$ where the shared secret is $Z=x_P$ where $x_P$ is the x-coordinate of P, $\hat{r}_A$ comprises the linearly transformed random number associated with party A uses its transformed random number and $Q_s$ comprises the party B's public key of party B.

10. The method of claim 1 wherein the step of generating a random number generates two random numbers $r_1$ and $r_2$.

11. The method of claim 10 wherein the step of linearly transforming the random number includes the steps of first applying a linear transform to random numbers $r_1$ and $r_2$, then applying a second transformation thereto.

12. The method of claim 11 wherein the linear transformation is, $\hat{r}_1=k_{11}r_1+k_{12} \mod n$ and $\hat{r}_2=k_{21}r_2+k_{22} \mod n$, where $k_{11}, k_{12}, k_{21}, k_{22}$ are instance specific, compile time randomly picked numbers and $k_{11}, k_{12}, k_{21}, k_{22} \in Z_n^*$, where n is the order of the point G, and where Z is a shared secret.

13. The method of claim 12 wherein the second transformation is $t_2$ on the transformed-random numbers $\hat{r}_1$ and $\hat{r}_2$ and is defined as $\hat{\hat{r}}_{11}=(\hat{r}_1+\hat{r}_2) \mod 2^N$, and $\hat{\hat{r}}_{22}=(\hat{r}_1+2\hat{r}_2) \mod 2^N$.

14. The method of claim 13 wherein $r_1$ is chosen for computing the public key.

15. The method of claim 14 where the step of generating a public key computes auxiliary elliptic curve points $\hat{G}_{11}=k_{11}^{-1}G$; $\hat{G}_{12}=k_{11}^{-1}\hat{G}_{11}$;
$u_{11}=(2\hat{\hat{r}}_{11}-\hat{\hat{r}}_{22} \mod 2^N)k_{11} \mod n$ and $U_{12}=(k_{11}-k_{12})\hat{G}_{11}$ and then computes $Q=u_{11}\hat{G}_{12}+U_{12}$.

16. The method of claim 15 wherein the linearly transformed random number is associated with party A and further comprising the steps of receiving a public key of party B and deriving a shared secret therefrom using the linearly transformed random number associated with party A.

17. The method of claim 16 wherein the step of deriving the shared secret computes $\hat{Q}_{B_{11}}=k_{11(A)}^{-1}\hat{Q}_B$; $\hat{Q}_{B_{12}}=(2\hat{\hat{r}}_{11(A)}-\hat{\hat{r}}_{22(A)}) \mod 2^N)\hat{Q}_{B_{11}}$; and $\hat{Q}_{B_{13}}=(k_{11(A)}-k_{12(A)})\hat{Q}_{B_{11}}$ and then $P=\hat{Q}_{B_{12}}+\hat{Q}_{B_{13}}$ where the shared secret is $Z=x_P$ where $x_P$ is the x-coordinate of P, $\hat{r}_A$ comprises the linearly transformed random number associated with party A uses its transformed random number and $Q_s$ comprises the party B's public key of party B.

18. The method of claim 13 wherein $r_2$ is chosen for computing the public key.

19. The method of claim 18 where the step of generating a public key computes auxiliary elliptic curve points $\hat{G}_{21}=k_{21}^{-1}G$; $\hat{G}_{22}=k_{21}^{-1}\hat{G}_{21}$; $u_{21}=(\hat{\hat{r}}_{22}-\hat{\hat{r}}_{11} \mod 2^N)k_{21} \mod n$ and $U_{22}=(k_{21}-k_{22})\hat{G}_{21}$ and then computes $Q=u_{21}*\hat{G}_{22}+U_{22}$.

20. The method of claim 19 wherein the linearly transformed random number is associated with party A and further comprising the steps of receiving a public key of party B and deriving a shared secret therefrom using the linearly transformed random number associated with party A.

21. The method of claim 20 wherein the step of deriving the shared secret computes $\hat{Q}_{B_{21}}=k_{21(A)}^{-1}\hat{Q}_B$; $\hat{Q}_{B_{22}}=(\hat{\hat{r}}_{22(A)}-\hat{\hat{r}}_{11(A)}) \mod 2^N)\hat{Q}_{B_{21}}$; and $\hat{Q}_{B_{23}}=(k_{21(A)}-k_{22(A)})\hat{Q}_{B_{21}}$ and then $P=\hat{Q}_{B_{22}}+\hat{Q}_{B_{23}}$ where the shared secret is $Z=x_P$ where $x_P$ is the x-coordinate of P, $\hat{r}_A$ comprises the linearly transformed random number associated with party A uses its transformed random number and $Q_s$ comprises the party B's public key of party B.

22. The method of claim 11 wherein the linear transformation is $\hat{r}_1=k_{11}r_1$ and $\hat{r}_2=k_{21}r_2$, where $k_{11}$, and $k_{21}$ are instance specific, compile time randomly picked numbers, and $k_{11}, k_{21} \in Z_n^*$.

23. The method of claim 22 wherein the second transformation on the transformed-random numbers $\hat{r}_1$ and $\hat{r}_2$ is defined as $\hat{\hat{r}}_{11}=(\hat{r}_1+\hat{r}_2) \mod 2^N$, and $\hat{\hat{r}}_{22}=(\hat{r}_1+2\hat{r}_2) \mod 2^N$.

24. The method of claim 23 wherein $r_1$ is chosen for computing the public key.

25. The method of claim 24 wherein the step of generating a public key computes auxiliary elliptic curve points $\hat{G}_{11}=k_{11}^{-1}G$; $\hat{G}_{12}=k_{11}^{-1}\hat{G}_{11}$; $u_{11}=(2\hat{\hat{r}}_{11}-\hat{\hat{r}}_{22} \mod 2^N)k_{11} \mod n$; and then computes $Q=u_{11}\hat{G}_{12}+G$.

26. The method of claim 25 wherein the linearly transformed random number is associated with party A and further comprising the steps of receiving a public key of party B and deriving a shared secret therefrom using the linearly transformed random number associated with party A.

27. The method of claim 26 wherein the step of deriving the shared secret computes $\hat{Q}_{B_{11}}=k_{11(A)}^{-1}\hat{Q}_B$; $\hat{Q}_{B_{12}}=(2\hat{\hat{r}}_{11(A)}-\hat{\hat{r}}_{22(A)}) \mod 2^N)\hat{Q}_{B_{11}}$; and then $P=\hat{Q}_{B_{12}}+\hat{Q}_B$ where the shared secret is $Z=x_P$ where $x_P$ is the x-coordinate of P, $\hat{r}_A$ comprises the linearly transformed random number associated with party A uses its transformed random number and $Q_s$ comprises the party B's public key of party B.

28. The method of claim 23 wherein $r_2$ is chosen for computing the public key.

29. The method of claim 28 wherein the step of generating a public key computes auxiliary elliptic curve points $\hat{G}_{21}=k_{21}^{-1}G$; $\hat{G}_{22}=k_{21}^{-1}\hat{G}_{21}$; $u_{21}=(\hat{\hat{r}}_{22}-\hat{\hat{r}}_{11} \mod 2^N)k_{21} \mod n$; and then computes $Q=u_{21}*\hat{G}_{22}+G$.

30. The method of claim 29 wherein the linearly transformed random number is associated with party A and further comprising the steps of receiving a public key of party B and deriving a shared secret therefrom using the linearly transformed random number associated with party A.

31. The method of claim 30 wherein the step of deriving the shared secret computes $\hat{Q}_{B_{21}}=k_{21(A)}^{-1}\hat{Q}_B$; $\hat{Q}_{B_{22}}=(\hat{\hat{r}}_{22(A)}-\hat{\hat{r}}_{11(A)}) \mod 2^N)\hat{Q}_{B_{21}}$; and then $P=\hat{Q}_{B_{22}}+\hat{Q}_B$ where the shared secret is $Z=x_P$ where $x_P$ is the x-coordinate of P, $\hat{r}_A$ comprises the linearly transformed random number associated with party A uses its transformed random number and $Q_s$ comprises the party B's public key of party B.

32. The method of claim 1 further comprising the steps of receiving a public key from another party and deriving a shared secret therefrom using the linearly transformed random number.

33. The method of claim 1, wherein some values are computed off-line.

34. A system for generating a public key for an elliptic curve Diffie-Hellman (ECDH) key exchange protocol without disclosing the private key during computation of the public key, the system comprising:
    one or more processors; and
    one or more memories operatively coupled to at least one of the one or more processors and having instructions stored thereon that, when executed by at least one of the one or more processors, cause at least one of the one or more processors to:
    generate a random number;
    interpret that random number as a linearly transformed random number $\hat{r}$ which results from an application of a linear transformation to an original random number r; and
    generate a public key Q corresponding to a private key d using the linearly transformed random number $\hat{r}$ by computing one or more auxiliary elliptic curve points based at least in part on the linearly transformed number $\hat{r}$ and computing the public key Q based at least in part on the one or more auxiliary elliptic curve points;
    wherein Q=dG=(r+1)G, wherein G comprises an elliptic curve generator point, wherein Q is generated without disclosing either d or r within a memory of a computing device generating Q, and wherein the generated public key Q is compatible with the corresponding private key d.

35. The system of claim 34 wherein the linear transformation is $r=k_1 r+k_2$ mod n where $k_1$ and $k_2$ are two instance specific, compile time random values and are elements of $Z_n^*$, where n is the order of the point G, and where Z is a shared secret.

36. The system of claim 34, wherein the step of generating a public key computes auxiliary elliptic curve points $\hat{G}=k_1^{-1}G$, $U_1=\hat{r}\hat{G}$, and $U_2$ $(k_1-k_2)\hat{G}$ and then computes $Q=U_1+U_2$.

37. At least one non-transitory computer-readable medium storing computer-readable instructions that, when executed by one or more computing devices, cause at least one of the one or more computing devices to:
    generate a random number;
    interpret that random number as a linearly transformed random number $\hat{r}$ which results from an application of a linear transformation to an original random number r; and
    generate a public key Q corresponding to a private key d using the linearly transformed random number $\hat{r}$ by computing one or more auxiliary elliptic curve points based at least in part on the linearly transformed number $\hat{r}$ and computing the public key Q based at least in part on the one or more auxiliary elliptic curve points;
    wherein Q=dG=(r+1)G, wherein G comprises an elliptic curve generator point, wherein Q is generated without disclosing either d or r within a memory of a computing device generating Q, and wherein the generated public key Q is compatible with the corresponding private key d.

38. The at least one non-transitory computer-readable medium of claim 37 wherein the linear transformation is $\hat{r}=k_1+k_2$ mod n where $k_1$ and $k_2$ are two instance specific, compile time random values and are elements of $Z_n^*$, where n is the order of the point G, and where Z is a shared secret.

39. The at least one non-transitory computer-readable medium of claim 37, wherein the step of generating a public key computes auxiliary elliptic curve points $\hat{G}=k_1^{-1}G$, $U_1=\hat{r}\hat{G}$, and $U_2=(k_1-k_2)\hat{G}$ and then computes $Q=U_1+U_2$.

* * * * *